(12) United States Patent
Garg et al.

(10) Patent No.: US 11,323,244 B2
(45) Date of Patent: May 3, 2022

(54) METHOD AND SYSTEM FOR OPTIMIZING TRANSACTION FLOW FOR BLOCKCHAIN MINING AND CONFIRMATION

(71) Applicant: MASTERCARD INTERNATIONAL INCORPORATED, Purchase, NY (US)

(72) Inventors: Chandan Garg, Haryana (IN); Jaipal Singh Kumawat, Rajasthan (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 396 days.

(21) Appl. No.: 16/591,745

(22) Filed: Oct. 3, 2019

(65) Prior Publication Data

US 2021/0105131 A1  Apr. 8, 2021

(51) Int. Cl.
*H04L 29/06* (2006.01)
*H04L 9/06* (2006.01)
*H04L 9/08* (2006.01)
*H04L 9/32* (2006.01)

(52) U.S. Cl.
CPC .......... *H04L 9/0637* (2013.01); *H04L 9/0643* (2013.01); *H04L 9/0825* (2013.01); *H04L 9/3297* (2013.01); *H04L 2209/38* (2013.01)

(58) Field of Classification Search
CPC ... H04L 9/0637; H04L 9/0643; H04L 9/0825; H04L 9/3297; H04L 2209/38; H04L 9/30; H04L 9/0618; H04L 9/3247; H04L 9/3239; H04L 9/3263; H04L 2209/56; H04L 9/0656; G06F 21/62; G06F 21/6209; G06F 21/6218; G06F 21/6227; G06F 21/64; G06F 16/1824; G06F 21/44; G06F 21/629; G06F 16/2379; G06F 16/9027; G06Q 20/06; G06Q 20/382; G06Q 20/401; G06Q 2220/00; G06Q 20/381; G06Q 40/04;
(Continued)

(56) References Cited

U.S. PATENT DOCUMENTS

| | | | |
|---|---|---|---|
| 11,186,196 B2* | 11/2021 | Singh | B60L 53/14 |
| 2013/0159152 A1* | 6/2013 | Minor | G06Q 40/00 705/30 |
| 2020/0052884 A1* | 2/2020 | Tong | H04L 9/3239 |

(Continued)

*Primary Examiner* — Malcolm Cribbs
(74) *Attorney, Agent, or Firm* — Buchanan Ingersoll & Rooney PC

(57) ABSTRACT

A method for confirming a blockchain transaction utilizing output from a transaction still waiting inclusion in a blockchain includes: storing, in a node of a blockchain network, a plurality of waiting blockchain transactions not included in a blockchain associated with the blockchain network; receiving a new blockchain transaction including a transaction amount, destination address, digital signature, and an unspent transaction output, where the unspent transaction output is a reference to one waiting blockchain transactions; validating the new blockchain transaction including confirmation of the one of the waiting blockchain transactions; generating a new block including a block header and a plurality of blockchain data entries including at least the new blockchain transaction and the one of the waiting blockchain transactions; and transmitting the generated new block to a plurality of additional nodes in the blockchain network for confirmation.

16 Claims, 5 Drawing Sheets

(58) Field of Classification Search
CPC ........... G06Q 20/3825; G06Q 20/3827; G06K 9/00577; G06K 2009/00583
See application file for complete search history.

(56) References Cited

U.S. PATENT DOCUMENTS

| | | | |
|---|---|---|---|
| 2020/0162239 A1* | 5/2020 | Carver | H04L 9/0891 |
| 2020/0183917 A1* | 6/2020 | Duchastel | G06F 16/2379 |
| 2020/0273025 A1* | 8/2020 | Sharma | G06Q 20/3674 |
| 2020/0380825 A1* | 12/2020 | Purohit | G07F 17/3251 |
| 2021/0026841 A1* | 1/2021 | Kumawat | H04L 9/3239 |

* cited by examiner

METHOD AND SYSTEM FOR OPTIMIZING TRANSACTION FLOW FOR BLOCKCHAIN MINING AND CONFIRMATION

FIELD

The present disclosure relates to confirming a blockchain transaction utilizing output from a transaction still waiting inclusion in a blockchain, specifically the use of a waiting transaction whose output is used in a new pending transaction for confirmation thereof to optimize transaction mining and confirmation and preventing failed transactions.

BACKGROUND

Blockchain was initially created as a storage mechanism for use in conducting payment transactions with a cryptographic currency. Using a blockchain provides a number of benefits, such as decentralization, distributed computing, transparency regarding transactions, and yet also providing anonymity as to the individuals or entities involved in a transaction. However, there are tradeoffs for taking advantage of a blockchain. Notably, there is often a long delay period in the confirmation of cryptographic currency transactions conducted via a blockchain, as new blocks are only added every ten minutes on average. Furthermore, blockchains often rely on miners that participate in confirming transactions, where miners generally operate on the collection of fees. In these cases, miners may neglect to confirm transactions that pay lower fees than others, which can greatly increase the time for confirmation of a transaction.

At the same time, if an individual is to receive payment in such a transaction, they may have to wait a significant period of time for confirmation of that transaction. As a result, the individual is unable to use the payment they are waiting on until the transaction has been confirmed and added to the blockchain. The individual is therefore at the mercy of the payer and miners of the initial transaction to be able to use the currency. In cases where an individual is awaiting payment to make an urgent payment of their own, use of a blockchain could be detrimental, and accordingly avoided, which will discourage individuals from use of blockchains entirely.

Thus, there is a need to have an improved blockchain processing system where an unconfirmed transaction can be taken into account for the confirmation of a new, pending transaction.

SUMMARY

The present disclosure provides a description of systems and methods for confirming a blockchain transaction utilizing output from a transaction still waiting inclusion in a blockchain. When a new blockchain transaction is submitted, the input for the transaction is the output of an earlier transaction. Traditionally, if there is no earlier transaction whose output is on the blockchain and can be confirmed, the new transaction would be denied. However, in the systems and methods discussed herein, blockchain nodes will utilize pending transactions. The earlier transaction whose output is being relied upon is confirmed, and that confirmation used to confirm the new transaction. Both transactions are included in the next block that is added to the blockchain, ensuring that both confirmed transactions are posted to prevent any unauthorized spending by the new transaction. The result is that a user can submit a transaction to utilize payment they have not yet received, as long as the initial payment is pending and can be confirmed, preventing the user from having to wait a long delay for confirmation of the initial transaction.

A method for confirming a blockchain transaction utilizing output from a transaction still waiting inclusion in a blockchain includes: storing, in a memory of a node in a blockchain network, a plurality of waiting blockchain transactions, where each of the plurality of waiting blockchain transactions is not included in a blockchain associated with the blockchain network; receiving, by a receiver of the node, a new blockchain transaction, the new blockchain transaction including at least a transaction amount, destination address, digital signature, and an unspent transaction output, where the unspent transaction output is a reference to one of the plurality of waiting blockchain transactions; validating, by a processor of the node, the new blockchain transaction, where validation includes confirmation of the one of the plurality of waiting blockchain transactions; generating, by the processor of the node, a new block, the new block including at least a block header and a plurality of blockchain data entries, the blockchain data entries including at least the new blockchain transaction and the one of the plurality of waiting blockchain transactions; and transmitting, by a transmitter of the node, the generated new block to a plurality of additional nodes in the blockchain network for confirmation.

A system for confirming a blockchain transaction utilizing output from a transaction still waiting inclusion in a blockchain includes: a blockchain network; a plurality of additional nodes included in the blockchain network; and a node included in the blockchain network, the node including a memory storing a plurality of waiting blockchain transactions, where each of the plurality of waiting blockchain transactions is not included in a blockchain associated with the blockchain network, a receiver receiving a new blockchain transaction, the new blockchain transaction including at least a transaction amount, destination address, digital signature, and an unspent transaction output, where the unspent transaction output is a reference to one of the plurality of waiting blockchain transactions, a processor validating the new blockchain transaction, where validation includes confirmation of the one of the plurality of waiting blockchain transactions, and generating a new block, the new block including at least a block header and a plurality of blockchain data entries, the blockchain data entries including at least the new blockchain transaction and the one of the plurality of waiting blockchain transactions, and a transmitter of the node transmitting the generated new block to a plurality of additional nodes in the blockchain network for confirmation.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Improved Confirmation of Blockchain Transactions

Figure 1:
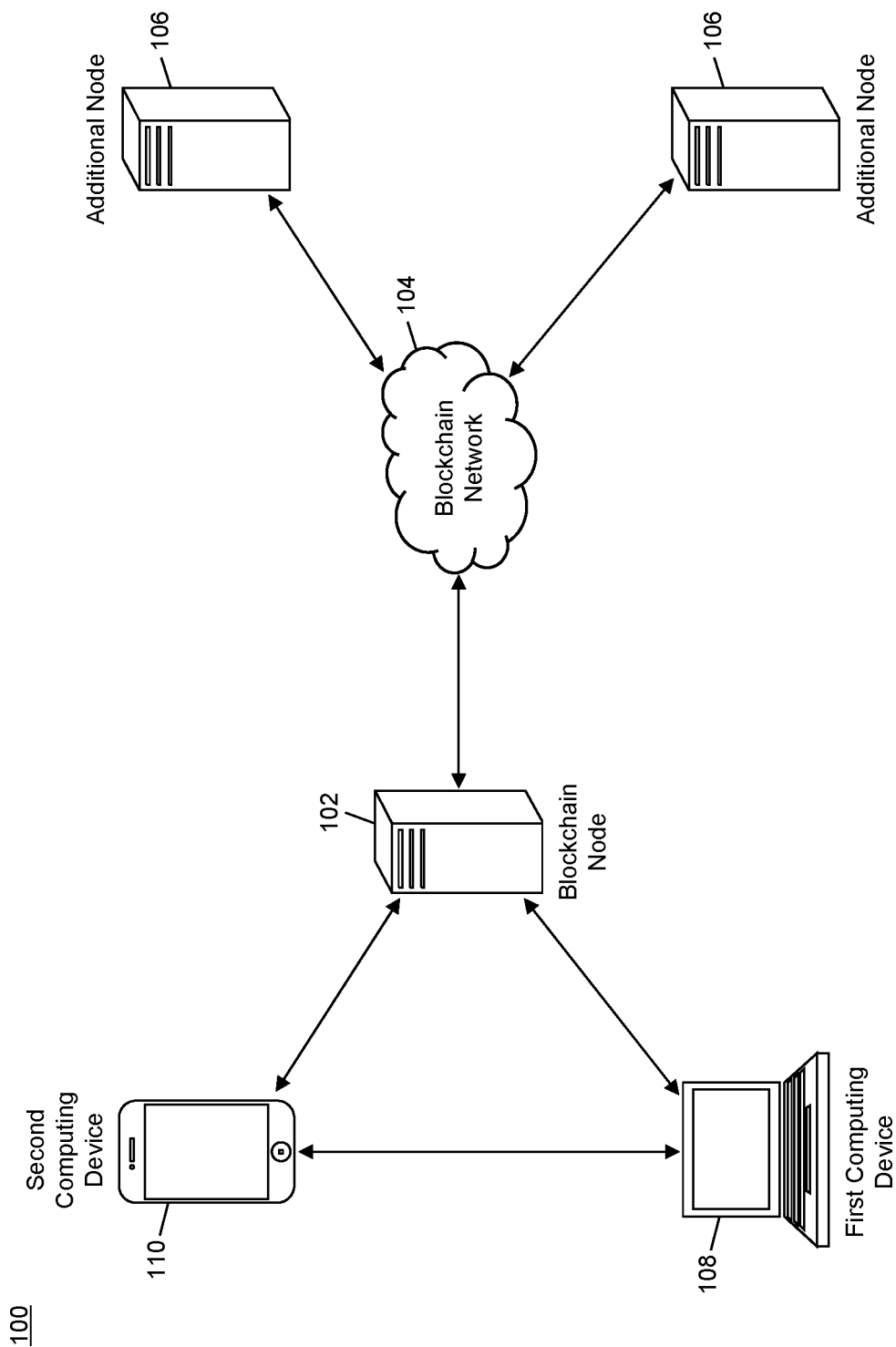
FIG. 1 is a block diagram illustrating a high level system architecture for confirming a blockchain transaction utilizing output from a waiting transaction in accordance with exemplary embodiments.

FIG. 1 illustrates a system 100 for the confirmation of a newly submitted blockchain transaction that utilizes output of an earlier transaction still awaiting inclusion in a blockchain.

Figure 2:
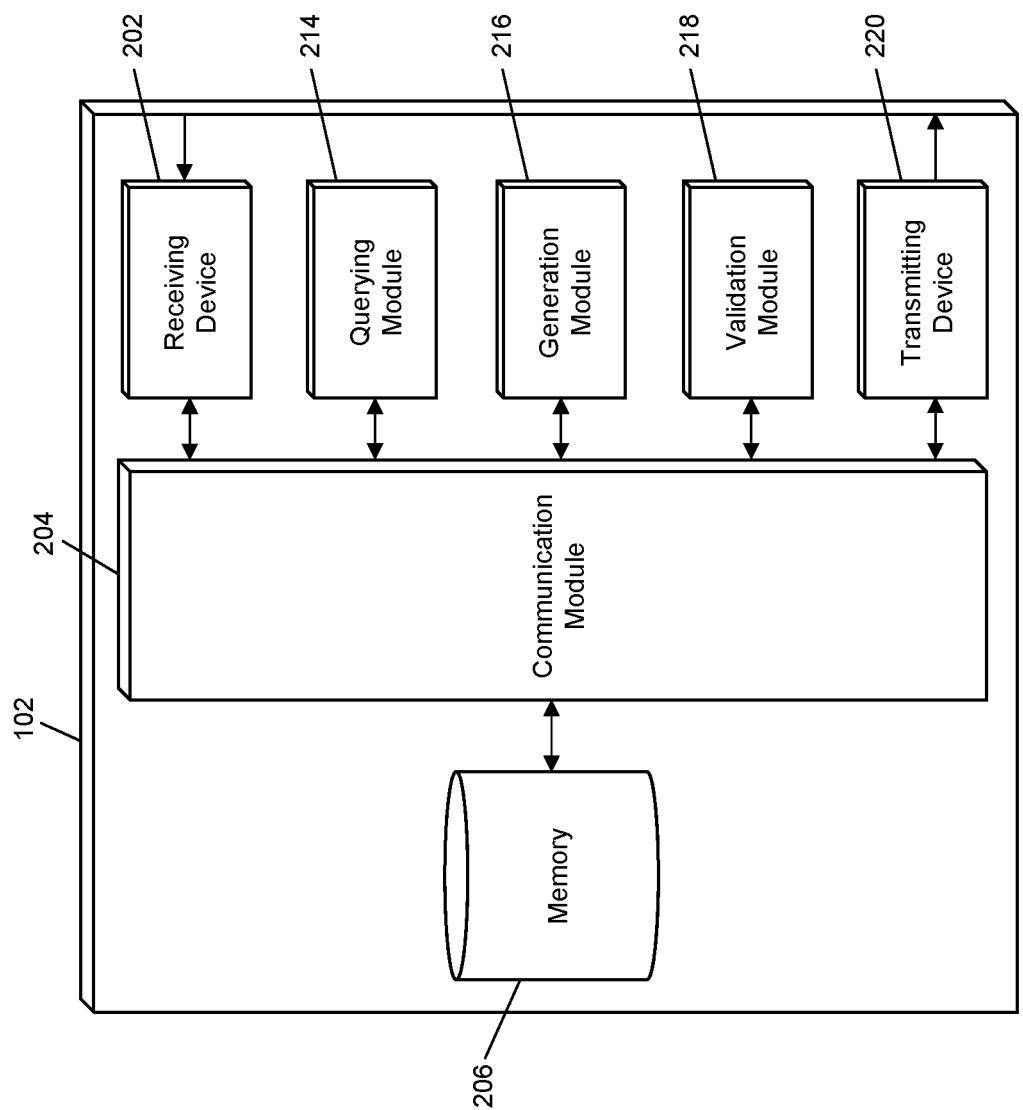
FIG. 2 is a block diagram illustrating the blockchain node of the system of FIG. 1 for improved confirmation of pending blockchain transactions in accordance with exemplary embodiments.
Figure 5:
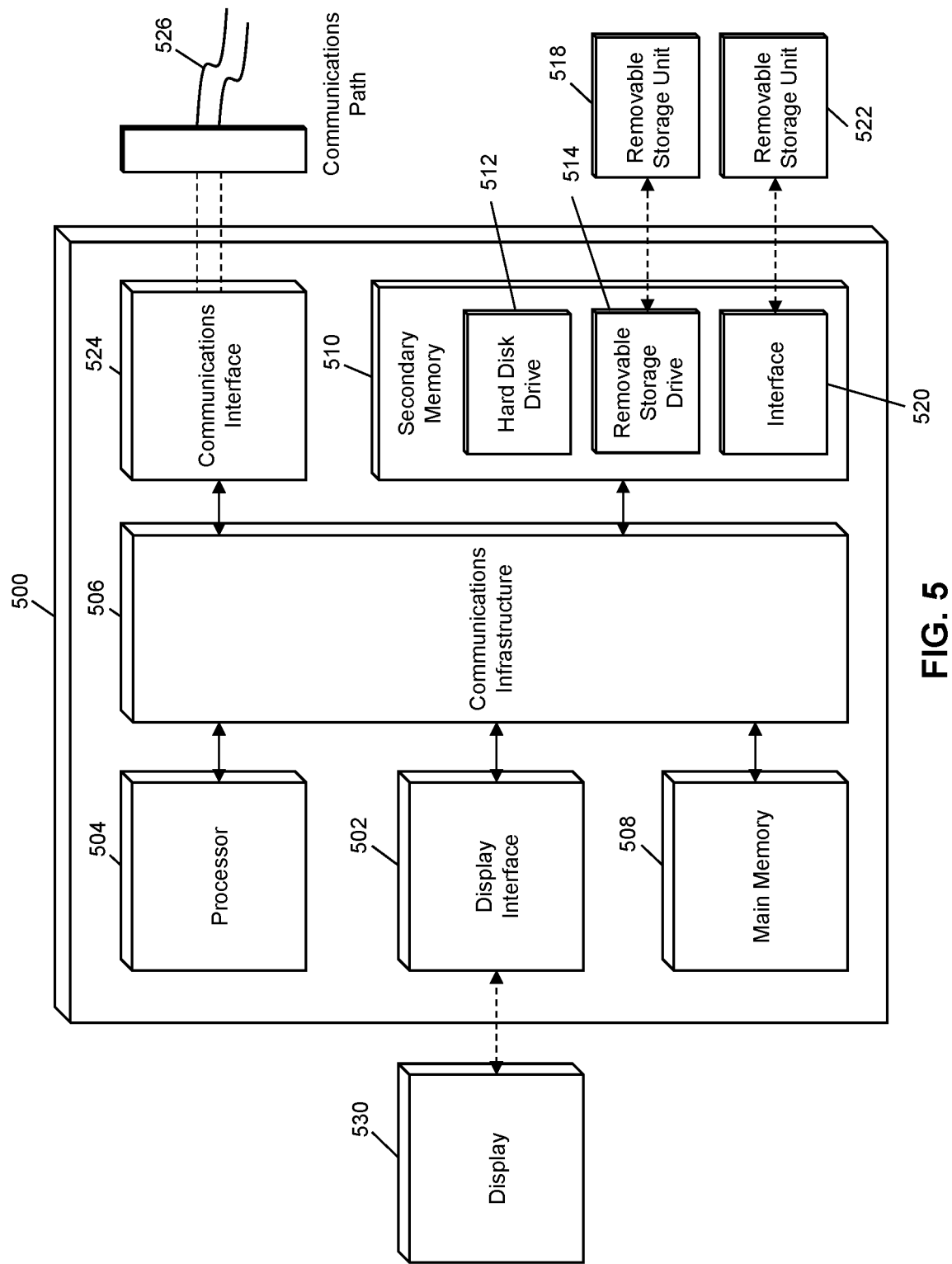
FIG. 5 is a block diagram illustrating a computer system architecture in accordance with exemplary embodiments.

The system 100 may include a blockchain node 102, which may be one of a plurality of nodes (e.g., the blockchain node 102 and a plurality of additional nodes 106) that comprise a blockchain network 104. Each blockchain node 102 and additional node 106 may be a computing system, such as illustrated in FIG. 2 and FIG. 5, discussed in more detail below, that is configured to perform functions related to the processing and management of the blockchain, including the generation of blockchain data values, verification of proposed blockchain transactions, verification of digital signatures, generation of new blocks, validation of new blocks, and maintenance of a copy of the blockchain. The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated, and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the block reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single node in the blockchain network 104 prior to the generation and addition of a new block to the blockchain in order for the change to be made permanent. Computational and communication limitations may make such a modification exceedingly difficult, if not impossible, thus rendering the blockchain immutable.

In some embodiments, the blockchain may be used to store information regarding blockchain transactions conducted between two different blockchain wallets. A blockchain wallet may include a private key of a cryptographic key pair that is used to generate digital signatures that serve as authorization by a payer for a blockchain transaction, where the digital signature can be verified by the blockchain network 106 using the public key of the cryptographic key pair. In some cases, the term "blockchain wallet" may refer specifically to the private key. In other cases, the term "blockchain wallet" may refer to a computing device (e.g., first computing device 108, second computing device 110) that stores the private key for use thereof in blockchain transactions. For instance, each computing device may each have their own private key for respective cryptographic key pairs, and may each be a blockchain wallet for use in transactions with the blockchain associated with the blockchain network. Computing devices may be any type of device suitable to store and utilize a blockchain wallet, such as a desktop computer, laptop computer, notebook computer, tablet computer, cellular phone, smart phone, smart watch, smart television, wearable computing device, implantable computing device, etc.

Each blockchain data value stored in the blockchain may correspond to a blockchain transaction or other storage of data, as applicable. A blockchain transaction may consist of at least: a digital signature of the sender of currency (e.g., the first computing device 108) that is generated using the sender's private key, a blockchain address of the recipient of currency (e.g., the second computing device 110) generated using the recipient's public key, and a blockchain currency amount that is transferred or other data being stored. In some blockchain transactions, the transaction may also include one or more blockchain addresses of the sender where blockchain currency is currently stored (e.g., where the digital signature proves their access to such currency), as well as an address generated using the sender's public key for any change that is to be retained by the sender. Addresses to which cryptographic currency has been sent that can be used in future transactions are referred to as "output" addresses, as each address was previously used to capture output of a prior blockchain transaction, also referred to as "unspent transactions," due to there being currency sent to the address in a prior transaction where that currency is still unspent. In some cases, a blockchain transaction may also include the sender's public key, for use by an entity in validating the transaction. For the traditional processing of a blockchain transaction, such data may be provided to a blockchain node 102 in the blockchain network 104, either by the sender or the recipient. The node may verify the digital signature using the public key in the cryptographic key pair of the sender's wallet and also verify the sender's access to the funds (e.g., that the unspent transactions have not yet been spent and were sent to address associated with the sender's wallet), and then include the blockchain transaction in a new block. The new block may be validated by other nodes in the blockchain network 104 before being added to the blockchain and distributed to all of the blockchain nodes 102 in the blockchain network 104 in traditional blockchain implementations. In cases where a blockchain data value may not be related to a blockchain transaction, but instead the storage of other types of data, blockchain data values may still include or otherwise involve the validation of a digital signature.

In the system 100, the first computing device 108 may submit a new blockchain transaction to the blockchain node 102, where the transaction is for the transfer of cryptographic currency to the blockchain wallet of the second computing device 110. In an example, the first computing device 108 may be submitting to transmit 100 units to the second computing device 110. The blockchain node 102 may receive the new transaction, referred to herein as the "first" transaction or "initial" transaction. The new transaction may include at least one prior transaction output, a digital signature generated by the first computing device's private key, a recipient address generated using the second computing device's public key, and the amount to be transferred. The initial transaction may be stored in a pool of pending transactions that are awaiting confirmation and inclusion in a new block. The initial transaction may wait in the pool until a blockchain node 102 confirms the transaction and includes it in a new block that is distributed to the additional nodes 106 for confirmation and inclusion in the blockchain.

The second computing device 110 may be aware of the payment that is attempted by the first computing device 108 in the initial transaction, and may have a desire to use that payment. Traditionally, the second computing device 110 would have to wait until the initial transaction is confirmed and included in a new block that is confirmed and added to the blockchain before a new transaction, referred to herein as the "second" or "subsequent" transaction, could be submitted and confirmed. In the system 100, the second computing device 110 may submit the second transaction to the blockchain node 102 for confirmation prior to inclusion of the first transaction in the blockchain.

The second blockchain transaction may include the digital signature generated using the second computing device's private key, a payment amount, a recipient address for a blockchain wallet to receive the payment amount, and at least one transaction output that includes an output of the initial blockchain transaction. The second computing device 110 may be able to identify and/or generate the output of the initial blockchain transaction as the second computing device 110 has knowledge of all of the data included in the initial blockchain transaction (as a recipient thereof, as the second computing device 110 will know its recipient address and the amount being sent thereto), without the initial blockchain transaction being included in the blockchain. This second blockchain transaction may be submitted to the blockchain node 102 using any traditional communication network and method.

The blockchain node 102 may receive the second blockchain transaction and place the transaction in the pool of pending transactions for mining and confirmation. When a blockchain node 102 selects the second blockchain transaction for confirmation, the blockchain node 102 may identify that the second blockchain transaction is relying on the output of a prior transaction that has not yet been included in the blockchain (e.g., by searching the transaction outputs in blockchain data values currently in the blockchain). The blockchain node 102 may then query the pool of pending transactions to identify the initial blockchain transaction therein, where its transaction output matches the input for the subsequent blockchain transaction.

Once the initial blockchain transaction is identified, the blockchain node 102 may validate the initial blockchain transaction. The validation of the initial blockchain transaction may include confirmation of the initial blockchain transaction by the blockchain node 102, or validation that the initial blockchain transaction has been previously confirmed by the blockchain node 102 or an additional node 106. For instance, the initial blockchain transaction may have bene previously confirmed for inclusion in a block that was not added in the blockchain (e.g., an orphaned block), where the initial blockchain transaction does not need to be confirmed again. In cases where confirmation must still occur, the blockchain node 102 may confirm the initial blockchain transaction. Confirmation of the transaction may include validation of the digital signature using the appropriate public key, verification of the input(s) for the transaction, and verification that the payment amount(s) being paid are covered by the transaction input(s).

Once the initial blockchain transaction is confirmed and validated, the blockchain node 102 may confirm the subsequent blockchain transaction. Confirmation of the subsequent blockchain transaction may be performed in the same manner as confirmation of the initial blockchain transaction, where part of the confirmation is verification of the input of the subsequent blockchain transaction that matches the output of the initial blockchain transaction. If the second blockchain transaction is also confirmed successfully, then both pending transactions may be included in a new block that is generated. The new block may include a new block header generated by the blockchain node 102 and a plurality of blockchain data values that includes at least the first and second blockchain transactions. The new block header may include at least a timestamp, a block reference value that is a hash of the block header of the most recent block that was already added to the blockchain, and a data reference value that refers to the blockchain data values included in the new block. In some cases, the data reference value may be the root of a Merkle tree generated using the blockchain data values. The new block may be transmitted to the additional nodes 106 in the blockchain network 104 for confirmation thereof, such as by ensuring that the block reference value and data reference values are correct. A majority of the additional nodes 106 may transmit a confirmation message back to the blockchain node 102, which may indicate successful confirmation of the new block. The new block may then be distributed to all nodes in the blockchain network 104, effectively adding the block to the blockchain. The first and second blockchain transactions may thereby be added to the blockchain, where the second computing device 110 was able to spend their payment received in the first blockchain transaction, prior to the first blockchain transaction even being included in the blockchain.

The result is that the second computing device 110 does not need to wait for confirmation of the first transaction before proceeding with their own transaction. This allows for users to not be at the mercy of blockchain nodes 102 as miners and mining fees that may not be attractive as paid by the first computing device 108. Inclusion of both pending transactions into a single new block that is added prevents the ability for one of the transactions to end up in an orphaned block, which could cause an error in future attempted confirmations in the blockchain. As a result, the methods and systems discussed herein provide for continued operation of the blockchain as an immutable record where new transactions do not have to wait on inclusion of an earlier transaction as input therein to be submitted for addition to the blockchain.

Blockchain Node

FIG. 2 illustrates an embodiment of a blockchain node 102 in the system 100. It will be apparent to persons having skill in the relevant art that the embodiment of the blockchain node 102 illustrated in FIG. 2 is provided as illustration only and may not be exhaustive to all possible configurations of the blockchain node 102 suitable for performing the functions as discussed herein. For example, the computer system 500 illustrated in FIG. 5 and discussed in more detail below may be a suitable configuration of the blockchain node 102. The additional nodes 106 in the system 100 and illustrated in FIG. 1 may be implemented as the blockchain node 102 illustrated in FIG. 2 and discussed herein.

The blockchain node 102 may include a receiving device 202. The receiving device 202 may be configured to receive data over one or more networks via one or more network protocols. In some instances, the receiving device 202 may be configured to receive data from additional nodes 106, first computing devices 108, second computing devices 110, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by additional nodes 106 as other blockchain nodes 102 in the blockchain network 104, which may be superimposed or otherwise encoded with blockchain data values for confirmation, confirmation of blockchain data values, new blocks for confirmation, confirmation messages of potential blocks, new blocks for addition to the blockchain, etc. The receiving device 202 may also be configured to receive data signals electronically transmitted by first computing devices 108 and second computing devices 110 that may be superimposed or otherwise encoded with new blockchain transactions for confirmation and inclusion in the blockchain.

The blockchain node 102 may also include a communication module 204. The communication module 204 may be configured to transmit data between modules, engines, databases, memories, and other components of the blockchain node 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the blockchain node 102 and external components of the blockchain node 102, such as externally connected databases, display devices, input devices, etc. The blockchain node 102 may also include a processing device. The processing device may be configured to perform the functions of the blockchain node 102 discussed herein as will be apparent to persons having skill in the relevant art. In some embodiments, the processing device may include and/or be comprised of a plurality of engines and/or modules specially configured to perform one or more functions of the processing device, such as a querying module 214, generation module 216, validation module 218, etc. As used herein, the term "module" may be software or hardware particularly programmed to receive an input, perform one or more processes using the input, and provides an output. The input, output, and processes performed by various modules will be apparent to one skilled in the art based upon the present disclosure.

The blockchain node 102 may also include a memory 206. The memory 206 may be configured to store data for use by the blockchain node 102 in performing the functions discussed herein, such as public and private keys, symmetric keys, etc. The memory 206 may be configured to store data using suitable data formatting methods and schema and may be any suitable type of memory, such as read-only memory, random access memory, etc. The memory 206 may include, for example, encryption keys and algorithms, communication protocols and standards, data formatting standards and protocols, program code for modules and application programs of the processing device, and other data that may be suitable for use by the blockchain node 102 in the performance of the functions disclosed herein as will be apparent to persons having skill in the relevant art. In some embodiments, the memory 206 may be comprised of or may otherwise include a relational database that utilizes structured query language for the storage, identification, modifying, updating, accessing, etc. of structured data sets stored therein. The memory 206 may be configured to store, for example, cryptographic keys, salts, nonces, communication information for blockchain nodes 102 and blockchain networks 104, address generation and validation algorithms, digital signature generation and validation algorithms, hashing algorithms for generating reference values, rules regarding generation of new blocks and block headers, a pool of pending transactions, etc.

The blockchain node 102 may include a querying module 214. The querying module 214 may be configured to execute queries on databases to identify information. The querying module 214 may receive one or more data values or query strings, and may execute a query string based thereon on an indicated database, such as the memory 206 of the blockchain node 102 to identify information stored therein. The querying module 214 may then output the identified information to an appropriate engine or module of the blockchain node 102 as necessary. The querying module 214 may, for example, execute a query on the memory 206 to identify a pending transaction as an initial transaction to be confirmed prior to confirmation of a subsequent blockchain transaction that is itself awaiting confirmation and inclusion in the blockchain.

The blockchain node 102 may also include a generation module 216. The generation module 216 may be configured to generate data for use by the blockchain node 102 in performing the functions discussed herein. The generation module 216 may receive instructions as input, may generate data based on the instructions, and may output the generated data to one or more modules of the blockchain node 102. For example, the generation module 216 may be configured to generate blockchain reference values, data reference values, new block headers, new blocks, etc.

The blockchain node 102 may also include a validation module 218. The validation module 218 may be configured to perform validations for the blockchain node 102 as part of the functions discussed herein. The validation module 218 may receive instructions as input, which may also include data to be used in performing a validation, may perform a validation as requested, and may output a result of the validation to another module or engine of the blockchain node 102. The validation module 218 may, for example, be configured to validate digital signatures, inputs for new blockchain transactions, payment amounts in new blockchain transactions, confirmations of initial blockchain transactions, etc.

The blockchain node 102 may also include a transmitting device 220. The transmitting device 220 may be configured to transmit data over one or more networks via one or more network protocols. In some instances, the transmitting device 220 may be configured to transmit data to additional nodes 106, first computing devices 108, second computing devices 110, and other entities via one or more communication methods, local area networks, wireless area networks, cellular communication, Bluetooth, radio frequency, the Internet, etc. In some embodiments, the transmitting device 220 may be comprised of multiple devices, such as different transmitting devices for transmitting data over different networks, such as a first transmitting device for transmitting data over a local area network and a second transmitting device for transmitting data via the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

The transmitting device 220 may be configured to electronically transmit data signals to additional nodes 106 as other blockchain nodes 102 in the blockchain network 104, which may be superimposed or otherwise encoded with new blockchain data values for confirmation, confirmations of blockchain data values, new blocks for confirmation, confirmation messages for new blocks, and confirmed blocks for inclusion in the blockchain. The transmitting device 220 may also be configured to electronically transmit data signals to first computing devices 108 and second computing devices 110 that may be superimposed or otherwise encoded with notification messages regarding submitted blockchain transactions, such as confirmations thereof, error messages (e.g., invalid signatures, failed confirmations, etc.), or any other notifications that may be suitable as a result of the methods and systems discussed herein.

Process for Confirming a Blockchain Transaction Utilizing a Pending Transaction

Figure 3:
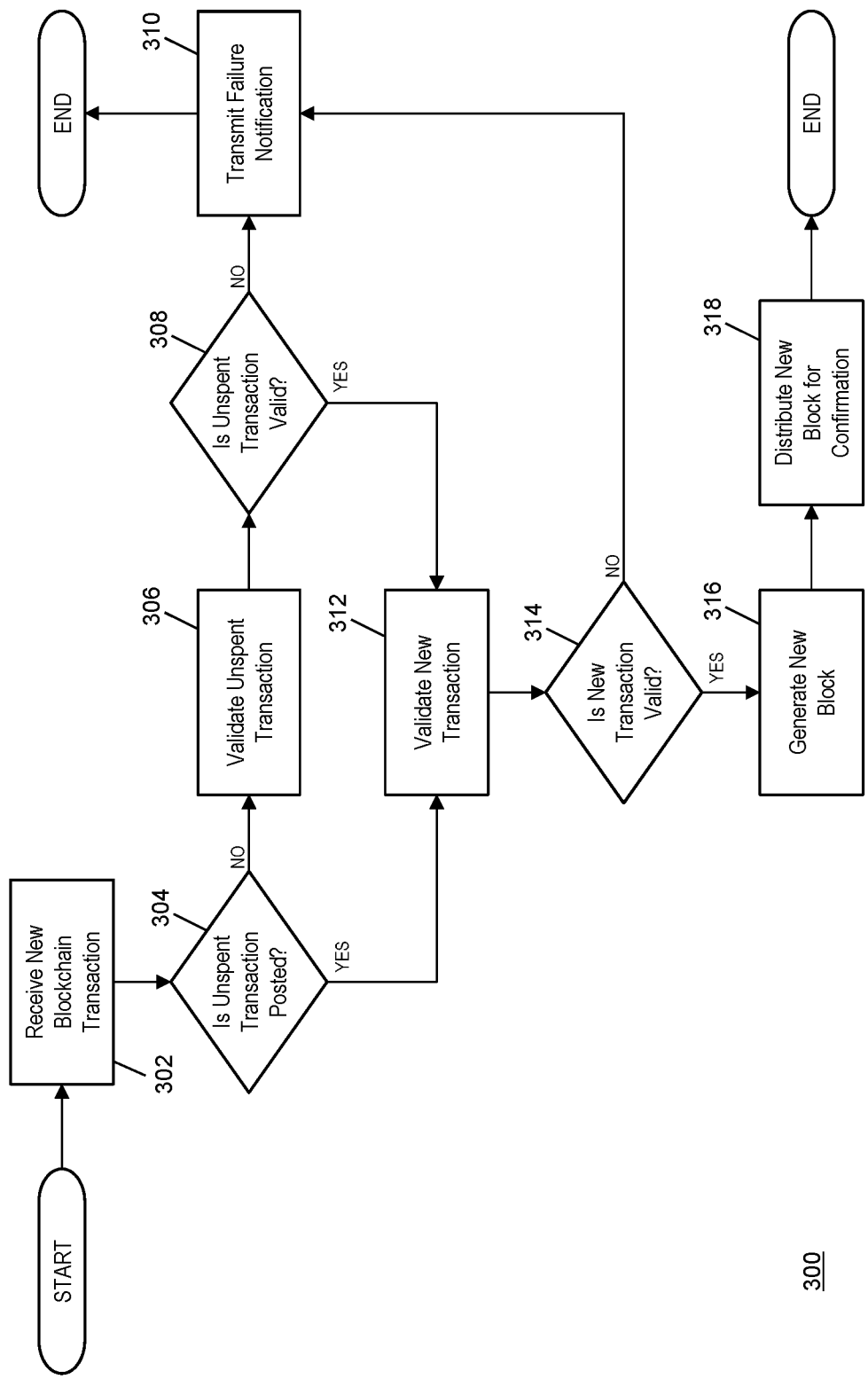
FIG. 3 is a flow diagram illustrating a process for confirming a blockchain transaction using output of an unconfirmed transaction using the blockchain node of FIG. 2 in accordance with exemplary embodiments.

FIG. 3 illustrates a process 300 for the confirmation of a newly submitted blockchain transaction that utilizes an output of a pending transaction as input thereof, while the pending transaction is still awaiting inclusion in a blockchain.

In step 302, the receiving device 202 of the blockchain node 102 may receive a new blockchain transaction for confirmation and inclusion in the blockchain, such as may be submitted by the first computing device 108 or second computing device 110. The new blockchain transaction may include a digital signature, one or more transaction inputs, one or more output addresses, and a payment amount for each output address. In step 304, the blockchain node 102 may determine if each transaction input, also referred to as "unspent" transactions, has been posted to the blockchain.

If, in step 304, at least one input transaction has not been posted to the blockchain, then, in step 306, the validation module 218 of the blockchain node 102 may validate the unspent transaction(s), which may include confirmation thereof, such as of the digital signature, payment amounts, and transaction inputs included therein. In step 308, the blockchain node 102 may determine if the validation of the unspent transaction(s) were successful. If the validation was unsuccessful, then confirmation of the new blockchain transaction fails. Then, in step 310, the transmitting device 220 of the blockchain node 102 may electronically transmit a notification message to the submitting computing device, which may include an indication that validation of one of the transaction inputs has failed.

If the unspent transaction(s) are determined to be valid, in step 308, or have already been posted to the blockchain, in step 304, then, in step 312, confirmation of the new blockchain transaction may be attempted by the validation module 218. In step 314, the blockchain node 102 may determine if confirmation of the new blockchain transaction was successful. If the confirmation failed, then the process 300 may return to step 310 where a notification message may be transmitted to the submitting computing device by the transmitting device 220 of the blockchain node 102. If, in step 314, the blockchain node 102 finds that confirmation of the new blockchain transaction was successful, then, in step 316, the generation module 216 of the blockchain node 102 may generate a new block for the blockchain that includes the new blockchain transaction and, if applicable, any unspent transactions that were confirmed in step 306. In step 318, the transmitting device 220 of the blockchain node 102 may distribute the newly generated block to additional nodes 106 in the blockchain network 104 for confirmation and inclusion in the blockchain.

Exemplary Method for Confirmation of a Blockchain Transaction

Figure 4:
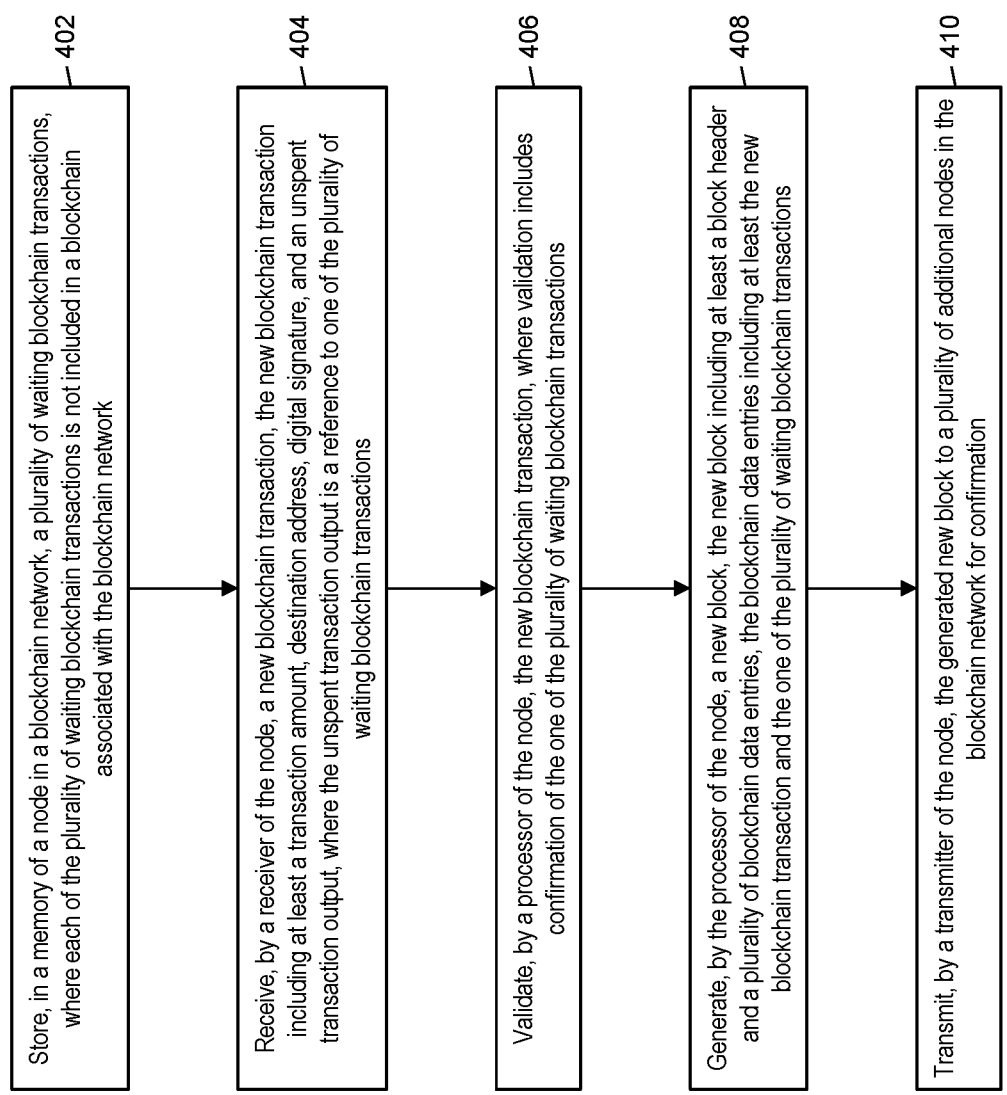
FIG. 4 is a flow chart illustrating an exemplary method for confirming a blockchain transaction utilizing output from a transaction still waiting inclusion in accordance with exemplary embodiments.

FIG. 4 illustrates a method 400 for confirmation of a blockchain transaction that utilizes an output from a prior blockchain transaction that is still waiting for inclusion in a blockchain.

In step 402, a plurality of waiting blockchain transactions may be stored in a memory (e.g., memory 206) of a node (e.g., blockchain node 102, additional node 106) in a blockchain network (e.g., blockchain network 104), where each of the plurality of waiting blockchain transactions is not included in a blockchain associated with the blockchain network. In step 404, a new blockchain transaction may be received by a receiver (e.g., receiving device 202) of the node, the new blockchain transaction including at least a transaction amount, destination address, digital signature, and an unspent transaction output, where the unspent transaction output is a reference to one of the plurality of waiting blockchain transactions.

In step 406, the new blockchain transaction may be validated by a processor (e.g., validation module 218) of the node, where validation includes confirmation of the one of the plurality of waiting blockchain transactions. In step 408, a new block may be generated by the processor (e.g., generation module 216) of the node, the new block including at least a block header and a plurality of blockchain data entries, the blockchain data entries including at least the new blockchain transaction and the one of the plurality of waiting blockchain transactions. In step 410, the generated new block may be transmitted by a transmitter (e.g., transmitting device 220) to a plurality of additional nodes (e.g., additional nodes 106) in the blockchain network for confirmation.

In one embodiment, the method 400 may further include receiving, by the receiver of the node, a confirmation message from the plurality of additional nodes confirming the new block for inclusion in the blockchain. In some embodiments, validating the new blockchain transaction may further include validating the digital signature included in the new blockchain transaction. In a further embodiment, the digital signature may be validated using a public key transmitted with the new blockchain transaction. In one embodiment, the method 400 may also include validating, by the processor of the node, the one of the plurality of waiting blockchain transactions prior to validating the new blockchain transaction.

In some embodiments, the one of the plurality of waiting blockchain transactions may have been previously confirmed by the node or one of the plurality of additional nodes in the blockchain network. In one embodiment, the method 400 may further include generating, by the processor (e.g., generation module 216) of the node, the block header included in the new block prior to generation of the new block, where the block header includes at least a timestamp, a block reference value, and a transaction reference value. In a further embodiment, the method 400 may even further include: generating, by the processor of the node, the transaction reference value by applying a hashing algorithm to the blockchain data entries included in the new block, and generating, by the processor of the node, the block reference value by applying the hashing algorithm to a header in a most recent block in the blockchain.

Computer System Architecture

FIG. 5 illustrates a computer system 500 in which embodiments of the present disclosure, or portions thereof, may be implemented as computer-readable code. For example, the blockchain node 102 and additional nodes 106 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for confirming a blockchain transaction utilizing output from a transaction still waiting inclusion in a blockchain. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for confirming a blockchain transaction utilizing output from a transaction still waiting inclusion in a blockchain, comprising:
   storing, in a memory of a node in a blockchain network, a plurality of waiting blockchain transactions, where each of the plurality of waiting blockchain transactions is not included in a blockchain associated with the blockchain network;
   receiving, by a receiver of the node, a new blockchain transaction, the new blockchain transaction including at least a transaction amount, destination address, digital signature, and an unspent transaction output, where the unspent transaction output is a reference to one of the plurality of waiting blockchain transactions;
   validating, by a processor of the node, the new blockchain transaction, where validation includes confirmation of the one of the plurality of waiting blockchain transactions;

generating, by the processor of the node, a new block, the new block including at least a block header and a plurality of blockchain data entries, the blockchain data entries including at least the new blockchain transaction and the one of the plurality of waiting blockchain transactions; and transmitting, by a transmitter of the node, the generated new block to a plurality of additional nodes in the blockchain network for confirmation.

2. The method of claim 1, further comprising:
receiving, by the receiver of the node, a confirmation message from the plurality of additional nodes confirming the new block for inclusion in the blockchain.

3. The method of claim 1, wherein validating the new blockchain transaction further includes validating the digital signature included in the new blockchain transaction.

4. The method of claim 3, wherein the digital signature is validated using a public key transmitted with the new blockchain transaction.

5. The method of claim 1, further comprising:
validating, by the processor of the node, the one of the plurality of waiting blockchain transactions prior to validating the new blockchain transaction.

6. The method of claim 1, wherein the one of the plurality of waiting blockchain transactions was previously confirmed by the node or one of the plurality of additional nodes in the blockchain network.

7. The method of claim 1, further comprising:
generating, by the processor of the node, the block header included in the new block prior to generation of the new block, where the block header includes at least a timestamp, a block reference value, and a transaction reference value.

8. The method of claim 7, further comprising:
generating, by the processor of the node, the transaction reference value by applying a hashing algorithm to the blockchain data entries included in the new block, and
generating, by the processor of the node, the block reference value by applying the hashing algorithm to a header in a most recent block in the blockchain.

9. A system for confirming a blockchain transaction utilizing output from a transaction still waiting inclusion in a blockchain, comprising:
a blockchain network;
a plurality of additional nodes included in the blockchain network; and
a node included in the blockchain network, the node including
a memory storing a plurality of waiting blockchain transactions, where each of the plurality of waiting blockchain transactions is not included in a blockchain associated with the blockchain network,
a receiver receiving a new blockchain transaction, the new blockchain transaction including at least a transaction amount, destination address, digital signature, and an unspent transaction output, where the unspent transaction output is a reference to one of the plurality of waiting blockchain transactions,
a processor
validating the new blockchain transaction, where validation includes confirmation of the one of the plurality of waiting blockchain transactions, and
generating a new block, the new block including at least a block header and a plurality of blockchain data entries, the blockchain data entries including at least the new blockchain transaction and the one of the plurality of waiting blockchain transactions, and
a transmitter of the node transmitting the generated new block to a plurality of additional nodes in the blockchain network for confirmation.

10. The system of claim 9, wherein the receiver of the node further receives a confirmation message from the plurality of additional nodes confirming the new block for inclusion in the blockchain.

11. The system of claim 9, wherein validating the new blockchain transaction further includes validating the digital signature included in the new blockchain transaction.

12. The system of claim 11, wherein the digital signature is validated using a public key transmitted with the new blockchain transaction.

13. The system of claim 9, wherein the processor of the node further validates the one of the plurality of waiting blockchain transactions prior to validating the new blockchain transaction.

14. The system of claim 9, wherein the one of the plurality of waiting blockchain transactions was previously confirmed by the node or one of the plurality of additional nodes in the blockchain network.

15. The system of claim 9, wherein the processor of the node further generates the block header included in the new block prior to generation of the new block, where the block header includes at least a timestamp, a block reference value, and a transaction reference value.

16. The system of claim 15, wherein the processor of the node further
generates the transaction reference value by applying a hashing algorithm to the blockchain data entries included in the new block, and
generates the block reference value by applying the hashing algorithm to a header in a most recent block in the blockchain.

* * * * *